(12) United States Patent
Kobayashi et al.

(10) Patent No.: US 9,268,620 B2
(45) Date of Patent: Feb. 23, 2016

(54) INFORMATION PROCESSING DEVICE

(75) Inventors: Motoki Kobayashi, Tokyo (JP); Shigeru Enomoto, Kanagawa (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 82 days.

(21) Appl. No.: 13/978,469

(22) PCT Filed: Sep. 13, 2011

(86) PCT No.: PCT/JP2011/070844
§ 371 (c)(1),
(2), (4) Date: Jul. 5, 2013

(87) PCT Pub. No.: WO2012/101863
PCT Pub. Date: Aug. 2, 2012

(65) Prior Publication Data
US 2013/0290986 A1    Oct. 31, 2013

(30) Foreign Application Priority Data
Jan. 24, 2011   (JP) ................................. 2011-012118

(51) Int. Cl.
G06F 9/54 (2006.01)
G06F 3/01 (2006.01)
G06F 3/048 (2013.01)
G06F 3/0481 (2013.01)

(52) U.S. Cl.
CPC ..... *G06F 9/542* (2013.01); *G06F 3/01* (2013.01); *G06F 3/048* (2013.01); *G06F 3/0481* (2013.01)

(58) Field of Classification Search
None
See application file for complete search history.

(56) References Cited

U.S. PATENT DOCUMENTS

| 2002/0116541 | A1* | 8/2002 | Parker et al. | 709/318 |
| 2004/0243682 | A1* | 12/2004 | Markki et al. | 709/207 |
| 2005/0022137 | A1* | 1/2005 | Fushikida | 715/823 |
| 2007/0174786 | A1* | 7/2007 | Doi et al. | 715/808 |
| 2007/0265031 | A1 | 11/2007 | Koizumi et al. | |
| 2009/0217285 | A1 | 8/2009 | Shimomura | |

(Continued)

FOREIGN PATENT DOCUMENTS

| CN | 1645869 | 7/2005 |
| CN | 1871838 | 11/2006 |

(Continued)

OTHER PUBLICATIONS

International Search Report dated Oct. 11, 2011 from the corresponding International Application No. PCT/JP2011/070844.

(Continued)

*Primary Examiner* — Tuan Dao
(74) *Attorney, Agent, or Firm* — Katten Muchin Rosenman LLP

(57) ABSTRACT

Provided is an information processing device capable of issuing a notification of an occurrence of an event depending on a current operation mode in a case where the information processing device operates in a plurality of operation modes. An information processing device operates in a plurality of operation modes including at least a first mode and a second mode, receives event information output by an event output program, and notifies a user that the event information has been received, and the information processing device changes a pattern of notification between a case where the event information is received during the operation in the first mode and a case where the event information is received during the operation in the second mode.

10 Claims, 5 Drawing Sheets

(56) References Cited

U.S. PATENT DOCUMENTS

| | | |
|---|---|---|
| 2009/0247112 A1 | 10/2009 | Lundy et al. |
| 2010/0088654 A1* | 4/2010 | Henhoeffer .................. 715/863 |
| 2010/0159995 A1* | 6/2010 | Stallings et al. ............. 455/566 |
| 2011/0231216 A1* | 9/2011 | Fyke et al. .................. 705/7.12 |

FOREIGN PATENT DOCUMENTS

| | | |
|---|---|---|
| EP | 1 555 795 | 7/2005 |
| JP | 2000307768 A | 11/2000 |
| JP | 2001-136250 | 5/2001 |
| JP | 2002044224 A | 2/2002 |
| JP | 2007-512635 | 5/2007 |
| JP | 2009010969 A | 1/2009 |
| WO | 2005-055034 | 6/2005 |
| WO | 2008/129626 | 10/2008 |
| WO | 2009-097555 | 8/2009 |
| WO | 2010/024986 | 3/2010 |

OTHER PUBLICATIONS

Notification of Reasons for Refusal dated Dec. 3, 2013, from corresponding Japanese Application No. 2012-554614.

European Search Report dated Jun. 26, 2014 from corresponding Application No. 11856739.5.

International Preliminary Report on Patentability and Written Opinion of the International Searching Authority dated Aug. 8, 2013 from corresponding International Application No. PCT/JP2011/070844.

Japanese Notification of Reasons for Refusal dated Jul. 14, 2015 from corresponding Application No. 2014-094807.

Chinese Notification of the First Office Action dated Aug. 5, 2015 from corresponding Application No. 201180065717.9.

\* cited by examiner

| PROGRAM ID | EVENT MESSAGE | EVENT RECEPTION DATE/TIME |
|---|---|---|
| MAIL | YOU HAVE THREE NEW MESSAGES. | 2011/1/10 15:58:32 |
| PROGRAM A | A IS NOW ONLINE. | 2011/1/10 15:48:10 |
| PROGRAM B | INSTALLATION IS COMPLETE. | 2011/1/9 11:20:02 |
| PROGRAM C | YOU HAVE RECEIVED ONE GAME ITEM. | 2011/1/9 10:58:42 |
| PROGRAM D | YOU HAVE MESSAGE FROM B. | 2011/1/9 10:30:25 |
| MUSIC PLAYBACK PROGRAM | SONG IS PAUSED | 2011/1/9 10:29:36 |

INFORMATION PROCESSING DEVICE

TECHNICAL FIELD

The present invention relates to an information processing device for notifying a user of event information output by a program, a control method therefor, a program, and an information storage medium.

BACKGROUND ART

There are information processing devices, such as a personal computer and a game machine, for executing a plurality of programs at the same timing. Some information processing devices as described above have a function of notifying a user of an occurrence of an event through a pop-up on a screen or other such method when some event to which the user's attention is to be attracted occurs in processing of a program running in a background. Patent Literature 1 discloses an information processing system for displaying an execution result of a given program while displaying an execution result of another program.

CITATION LIST

Patent Literature

[Patent Literature 1] US 2009/0217285 A1

SUMMARY OF INVENTION

Technical Problem

The above-mentioned information processing device may operate in a plurality of operation modes, for example, an operation mode of displaying an image drawn by a single application program on an entirety of a screen of a display device and an operation mode of functioning otherwise. Then, a situation in which a notification of an occurrence of an event as described above is difficult is conceivable depending on the operation mode of the information processing device.

The present invention has been made in view of the above-mentioned circumstances, and an object thereof is to provide an information processing device capable of issuing a notification of an occurrence of an event depending on a current operation mode in a case where the information processing device operates in a plurality of operation modes, an information processing method therefor, a program, and an information storage medium.

Solution to Problem

According to the present invention, there is provided an information processing device, which operates in a plurality of operation modes including at least a first mode and a second mode, the information processing device including: event information receiving means for receiving event information output by an event output program; and event notification means for notifying, when the event information receiving means receives the event information, a user that the event information has been received, in which the event notification means changes a pattern of notification between a case where the event information receiving means receives the event information during operation in the first mode and a case where the event information receiving means receives the event information during operation in the second mode.

In the information processing device, the first mode may be a mode of displaying an image drawn by a single application program on an entirety of a screen of a display device, and the event notification means may perform the notification by changing display of the screen in a case of during the operation in the second mode, and perform the notification by another method without changing the display of the screen in a case of during the operation in the first mode.

Further, the event notification means may perform the notification by causing a light-emitting body to emit light in the case of during the operation in the first mode.

Further, the light-emitting body may be an operation member to be operated by the user to confirmation of details of the event information subjected to the notification.

Further, in the information processing device, the event notification means may perform the notification by changing a color of a notification image displayed on the screen to a predetermined color in the case of during the operation in the second mode, and may perform the notification by causing the light-emitting body to emit light in the predetermined color in the case of during the operation in the first mode.

Further, in the information processing device, a sensor for sensing an operation of the user with respect to the screen may be disposed so as to be overlaid on the screen, and the information processing device may further include list display means for displaying a list of the event information notified of by the event notification means in the past on the screen when the sensor senses the operation of the user with respect to a display position of the notification image after the event notification means performs the notification by changing the color of the notification image.

Further, in the information processing device, the event notification means may interrupt the notification when the event output program whose execution result is being displayed on the screen outputs the event information during the operation in the first mode, and may perform the notification when the event output program whose execution result is being displayed on the screen outputs the event information during the operation in the second mode.

Further, the information processing device may further include list display means for displaying a list of the event information notified of by the event notification means in the past on the screen in response to a request made by the user, in which: the event information receiving means may receive the event information output by each of a plurality of event output programs; and the list display means may display on the screen, for the each of the plurality of event output programs, even when the each of the plurality of event output programs output event information items whose number exceeds a predetermined number in the past, only the predetermined number of event information items to be included in the list.

Further, the list display means may display on the screen the predetermined number of event information items output in a most recent past to be included in the list among a plurality of event information items output by the plurality of event output programs in the past.

Further, the information processing device may further include means for displaying on the screen, in a case where the user performs an operation for selecting one of a plurality of event information items included in the list in a state in which the list of the event information is displayed on the screen, an image indicating a processing result of the event output program that has output the selected one of the plurality of event information items.

According to the present invention, there is also provided a control method for an information processing device, which operates in a plurality of operation modes including at least a first mode and a second mode, the control method including: an event information receiving step of receiving event information output by an event output program; and an event notification step of notifying, when the event information is received in the event information receiving step, a user that the event information has been received, in which the event notification step includes changing a pattern of notification between a case where the event information receiving means receives the event information during operation in the first mode and a case where the event information receiving means receives the event information during operation in the second mode.

According to the present invention, there is also provided a program for causing an information processing device, which operates in a plurality of operation modes including at least a first mode and a second mode, to function as: event information receiving means for receiving event information output by an event output program; and event notification means for notifying, when the event information receiving means receives the event information, a user that the event information has been received, in which the event notification means changes a pattern of notification between a case where the event information receiving means receives the event information during operation in the first mode and a case where the event information receiving means receives the event information during operation in the second mode. This program may be stored on a computer-readable information storage medium.

According to the present invention, there is also provided another information processing device, including: event receiving means for receiving event information output by each of a plurality of event output programs; event notification means for notifying, when the event receiving means receives the event information, a user that the event information has been received; and list display means for displaying a list of the event information notified of by the event notification means in the past on a screen of a display device in response to a request made by the user, in which the list display means displays on the screen, for the each of the plurality of event output programs, even when the each of the plurality of event output programs output event information items whose number exceeds a predetermined number in the past, only the predetermined number of event information items to be included in the list.

Further, in the information processing device, the list display means may display on the screen the predetermined number of event information items output in a most recent past to be included in the list among a plurality of event information items output by the plurality of event output programs in the past.

Further, the information processing device may further include means for displaying on the screen, in a case where the user performs an operation for selecting one of a plurality of event information items included in the list in a state in which the list of the event information is displayed on the screen, an image indicating a processing result of one of the plurality of event output programs that has output the selected one of the plurality of event information items.

BRIEF DESCRIPTION OF DRAWINGS

FIG. 6 A diagram illustrating an example of a screen on which event information is notified of.

DESCRIPTION OF EMBODIMENTS

A detailed description is now made of an embodiment of the present invention with reference to the accompanying drawings.

Figure 1:
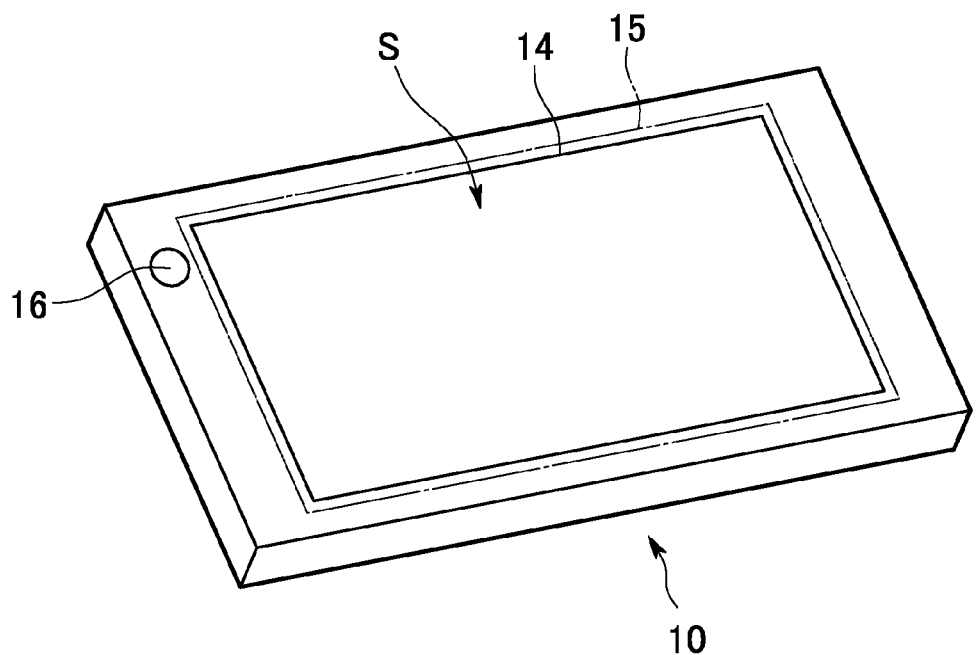
FIG. 1 A perspective view illustrating an example of an outer appearance of an information processing device according to an embodiment of the present invention.
Figure 2:
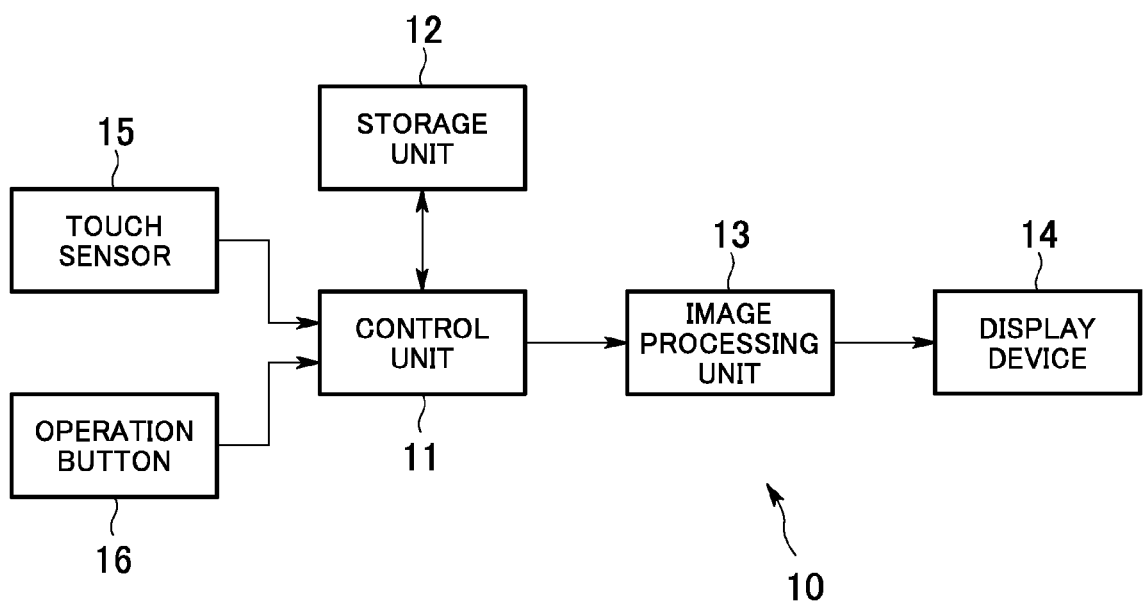
FIG. 2 A configuration block diagram illustrating a configuration of the information processing device according to the embodiment of the present invention.

FIG. 1 is a perspective view illustrating an example of an outer appearance of an information processing device 10 according to the embodiment of the present invention. Further, FIG. 2 is a configuration block diagram illustrating a configuration of the information processing device 10. As illustrated in those figures, the information processing device 10 includes a control unit 11, a storage unit 12, an image processing unit 13, a display device 14, a touch sensor 15, and an operation button 16.

The control unit 11 is, for example, a CPU, and executes various kinds of information processing in accordance with programs stored in the storage unit 12. A specific example of the processing executed by the control unit 11 in this embodiment is described later.

The storage unit 12 is, for example, a memory device such as a RAM or a ROM or a disk device, and stores the programs executed by the control unit 11 and various kinds of data. Further, the storage unit 12 also functions as a work memory for the control unit 11. Particularly in this embodiment, the information processing device 10 is to execute a plurality of application programs AP including a game application, and the storage unit 12 stores those application programs AP.

The image processing unit 13 includes, for example, a GPU and a frame buffer memory, and draws an image to be displayed on a screen S of the display device 14 in accordance with a draw instruction output from the control unit 11. As a specific example thereof, the image processing unit 13 includes the frame buffer memory corresponding to the screen S, and the GPU writes the image to the frame buffer memory every predetermined time in accordance with the instruction issued from the control unit 11. Then, the image written to this frame buffer memory is converted into a video signal at a predetermined timing, and output to the display device 14.

The display device 14 includes the screen S, and displays the image drawn by the image processing unit 13 on the screen S. Note that, the display device 14 may be various kinds of device for displaying an image, such as a liquid crystal display panel or an organic EL display panel. Further, in this embodiment, the display device 14 is provided within a casing of the information processing device 10, but the display device 14 may be a device independent of the information processing device 10.

The touch sensor 15 includes a substantially-rectangular detection surface having a shape and size corresponding to the screen S of the display device 14, and when an object comes in contact with this detection surface, detects a contact position of the object. The detection surface of the touch sensor 15 is disposed so as to be overlaid on the screen S. Therefore, when a user performs an operation for, for example, bringing the object such as his/her own finger or a stylus held by his/her hand into contact with the screen S, the touch sensor 15 can sense this user's operation. Note that, in the following description, for the sake of convenience thereof, the touch sensor 15 is assumed to detect the user's finger, and the user is assumed to perform an operation input by bringing his/her own finger into contact with the touch sensor 15. Further, the touch sensor 15 may not necessarily detect the position of the object only when the object comes into contact with the detection surface, but also detect the position of the object with respect to the detection surface when the object comes closer to within a range that allows detection on the detection surface. The touch sensor 15 may be of any type as long as the touch sensor 15 is a device of, for example, an electrostatic capacitance type, a pressure-sensitive type, or an optical type, which can detect the position of the object on the detection surface.

The operation button 16 is a kind of operation member used for the operation input performed by the user with respect to the information processing device 10 along with the touch sensor 15. The user depresses the operation button 16 to perform the operation input with respect to the information processing device 10. In addition, in this embodiment, the operation button 16 is a light-emitting body that emits light itself. Specifically, for example, a light-emitting element such as an LED is disposed inside the operation button 16, and the operation button 16 has a cover formed of a transparent member. With this configuration, the information processing device 10 can cause the operation button 16 to emit light. Note that, FIG. 1 illustrates only one operation button 16, but the information processing device 10 may the provided with a plurality of operation buttons. Further, other operation members such as a switch and an analog stick may be provided.

A description is now made of the application programs AP stored in the storage unit 12 to be executed by the information processing device 10. Note that, it is assumed below that the application programs AP are programs that can be selected by the user in a state in which a menu image Im described later is displayed. The information processing device 10 may execute various programs other than those application programs AP.

In this embodiment, the application programs AP are each categorized into any one of two kinds. That is, there are a full-mode programs AP1 that operate only in a full mode (first mode) and light programs AP2 capable of operating in a menu mode (second mode) different from the full mode. The information processing device 10 according to this embodiment operates in any one of a plurality of operation modes including at least the full mode and the menu mode. The full mode is an operation mode in which one program (full-mode program AP1) alone occupies an entirety of the screen S to operate, and details of the user's operation sensed by the touch sensor 15 during operation in the full mode are handled as an input with respect to the full-mode program AP1 being executed. The full-mode program AP1 is executed only in the full mode, and a program output image indicating a processing result thereof is displayed on the entirety of the screen S. Note that, in terms of property of occupying the entirety of the screen S in its execution, only one full-mode program AP1 can be executed simultaneously, and when processing of another full-mode program AP1 is to be executed, the processing of the full-mode program AP1 being currently executed needs to be finished or temporarily interrupted. On the other hand, the menu mode is an operation mode in which a menu image display control section 21 described later displays the menu image Im or a program-related image Ip within a predetermined area of the screen S, and the light program AP2 displays the program output image indicating the processing result thereof in a partial area of the screen S as the program-related image Ip. Further, in the menu mode, the program-related image Ip relating to each of the plurality of application programs AP can be displayed by being switched, and hence a plurality of light programs AP2 can be executed simultaneously.

Figure 3:
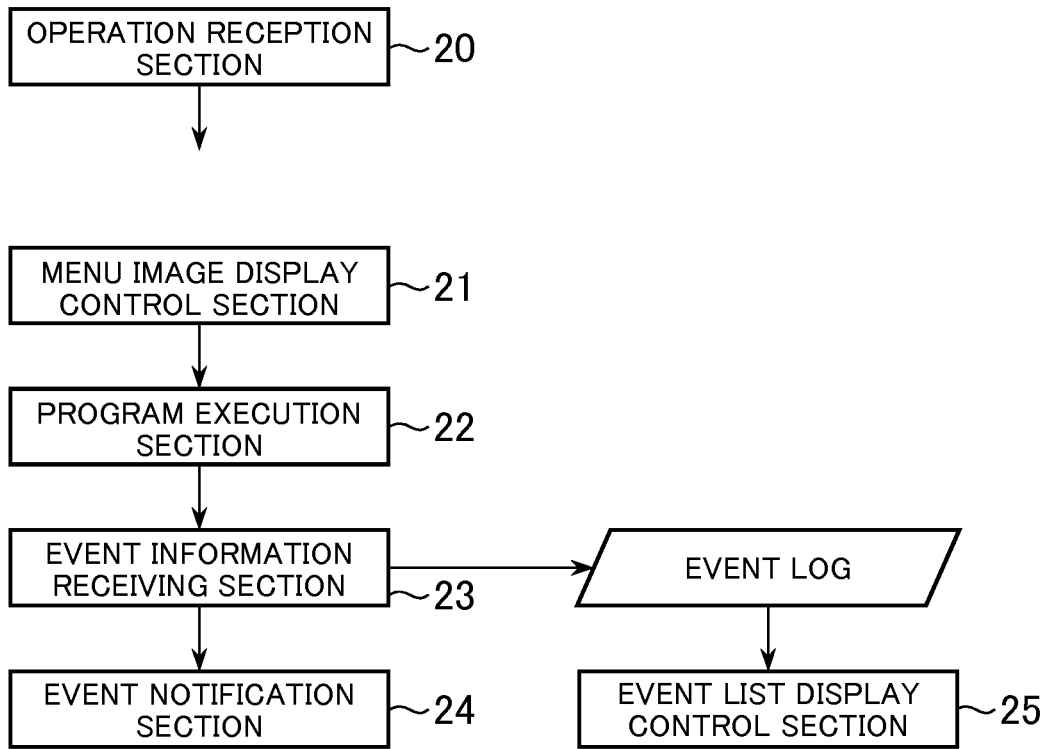
FIG. 3 A functional block diagram illustrating functions realized by the information processing device according to the embodiment of the present invention.

A description is now made of functions realized by the information processing device 10 according to this embodiment. FIG. 3 is a functional block diagram illustrating the functions realized by the information processing device 10. As illustrated in the figure, the information processing device 10 functionally includes an operation reception section 20, the menu image display control section 21, a program execution section 22, an event information receiving section 23, an event notification section 24, and an event list display control section 25. Those functions are realized by the control unit 11 executing the programs stored in the storage unit 12. The programs may be provided to the information processing device 10 by, for example, being stored in various computer-readable information storage media such as an optical disc. Alternatively, the programs may be provided to the information processing device 10 via a communication network such as the Internet.

The operation reception section 20 received the user's instruction operation performed through the touch sensor 15 or the operation button 16. Particularly in this embodiment, the user performs the operation input with respect to the information processing device 10 by, for example, bringing his/her own finger into contact with the detection surface of the touch sensor 15 or sliding the finger with the finger kept in contact with the detection surface. In the following description, such an action that the user brings his/her finger into contact with the detection surface at one point thereof only for a short time is referred to as "tap operation". When the tap operation is performed, the operation reception section 20 outputs the position of the tap operation (that is, position within the detection surface with which the user has brought his/her finger into contact). Further, such an action that the user brings his/her finger into contact with the detection surface at one point thereof, moves the finger linearly in any direction on the detection surface with the contact position as a start point, and releases the finger is referred to as "slide operation". When the slide operation is performed, the information processing device 10 performs each kind of information processing depending on the direction in which the user has moved the finger in the above-mentioned operation. That is, the slide operation is such an operation that the user specifies the direction for the information processing device 10. When the slide operation is performed while the menu image Im or the program-related image Ip described later is displayed, the operation reception section 20 identifies the direction specified by the user based on the positions of the start point thereof and an end point thereof. The direction identified by the operation reception section 20 may be, for example, any one of the four directions of up/down/left/right on the screen S. The respective functional components described later execute various kinds of information processing based on details of the tap operation and the slide operation received by the operation reception section 20.

The menu image display control section 21 displays the menu image Im on the screen S at a predetermined timing, for example, at a time of booting the information processing device 10 or at a time when the user instructs for the menu display. The menu image Im is an image which is presented for prompting the user to select the application program AP to be executed and which includes a plurality of menu item images Ic from which the user is to make a selection. Each of a plurality of menu item images Ic is associated with any one of the plurality of application programs AP. Each menu item image Ic may be an icon image or the like indicating the corresponding application program AP.

Figure 4:
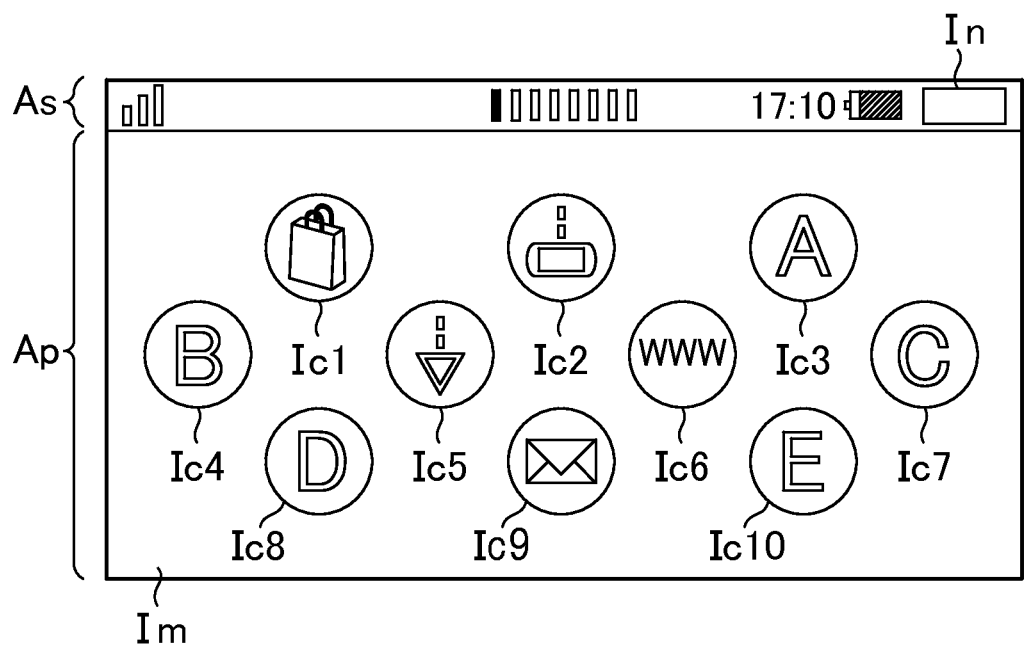
FIG. 4 A diagram illustrating an example of a screen for displaying a menu image.
Figure 5:
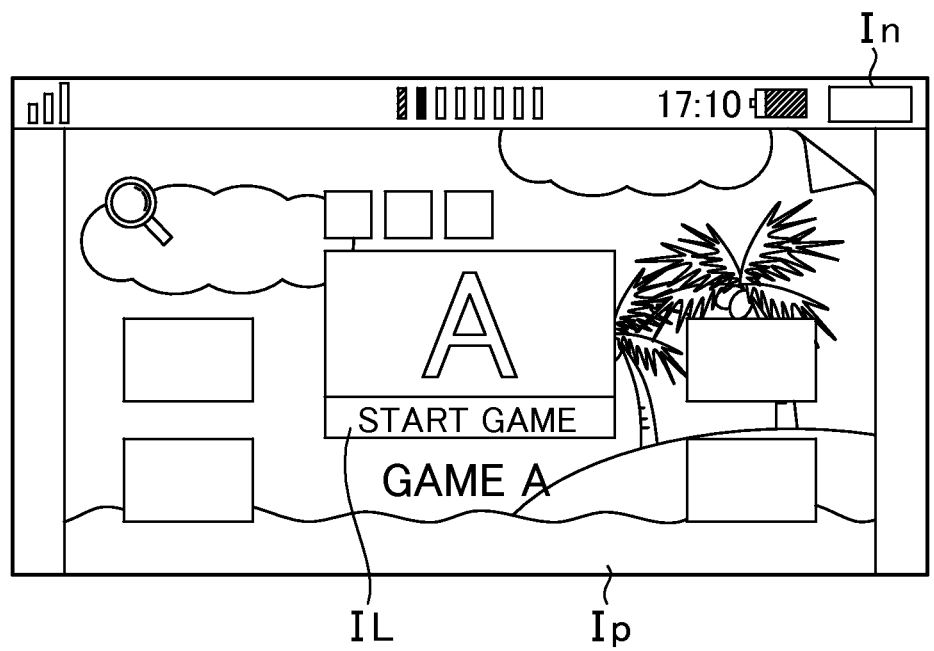
FIG. 5 A diagram illustrating an example of a screen for displaying a program-related image.

FIG. 4 is a diagram illustrating an example of the screen S on which the menu image Im is displayed. In this figure, the menu image Im includes ten menu item images Ic1 to Ic10 each of which is associated with each application program AP. Further, in FIG. 4, a narrow rectangular status bar display area As is provided along an upper side of the screen S, and a status bar is displayed in the status bar display area As. The status bar includes therein a notification image In described later. Further, the status bar may include therein, for example, various kinds of information indicating statuses, such as a remaining battery level and a communications status, of the information processing device 10 or a current time. In addition, the area in which the menu image Im within the screen S is displayed is referred to as "program display area Ap". In the example of FIG. 5, the program display area Ap is an area defined by excluding the status bar display area As from the screen S, but if there is no need to displaying the status bar at all times, the program display area Ap may be the entirety of screen S. Note that, in the above-mentioned menu mode, it is assumed that the menu image display control section 21 is displaying the status bar in the status bar display area As and displaying the menu image Im or the program-related image Ip (image relating to any one of the plurality of application programs AP) in the program display area Ap.

In the state in which the menu image Im is displayed, the user performs a menu selection operation by tapping the position at which any one of the menu item images Ic is displayed. That is, the user selects any one of the menu item images Ic, to thereby instruct to display the program-related image Ip relating to the application program AP associated with the selected menu item image Ic. However, in this embodiment, the application program AP corresponding to the selected menu item image Ic is not always started as soon as the user selects the menu item image Ic. Specifically, when the user selects the full-mode program AP1, the menu image display control section 21 only displays the program-related image Ip corresponding to the selected full-mode program AP1 in the program display area Ap without starting the full-mode program AP1 at that time point. On the other hand, when the user selects the light program AP2, the menu image display control section 21 instructs the program execution section 22 to start the light program AP2, and displays an image output by the light program AP2 in the program display area Ap as the program-related image Ip corresponding to the light program AP2.

The program-related image Ip is an image including information associated with the corresponding application program AP, and is displayed in the program display area Ap of the screen S. Specifically, the program-related image Ip corresponding to the full-mode program AP1 includes a startup image with respect to which the user is to perform an operation for instructing to start the full-mode program AP1. In this embodiment, the startup image is assumed to be a start button image IL indicating a start button. It should be understood that the program-related image Ip corresponding to the full-mode program AP1 is displayed before the full-mode program AP1 is started, and is therefore drawn by another program (in this description, program for realizing the menu image display control section 21) instead of being drawn by the full-mode program AP1 itself.

FIG. 5 is a diagram illustrating an example of a screen for displaying the program-related image Ip corresponding to the full-mode program AP1. In the example of this figure, the start button image IL with respect to which an operation for starting the corresponding full-mode program AP1 is to be performed is located in a center of the program-related image Ip. Further, the start button image IL is surrounded by various kinds of related information relating to the program prepared by a provider of the full-mode program AP1.

On the other hand, the program-related image Ip corresponding to the light program AP2 may itself be the program output image indicating the processing result of the light program AP2. In this case, the program-related image Ip corresponding to the light program AP2 is drawn by the light program AP2 itself unlike in the case of the full-mode program AP1.

Further, the menu image display control section 21 is configured to switch the image to be displayed in the program display area Ap between the menu image Im and the program-related image Ip in response to the user's instruction. In addition, the menu image display control section 21 may display a plurality of program-related images Ip displayed as a result of the user's selection of the plurality of menu item images Ic in order in the past by switching the plurality of program-related images Ip in response to the user's instruction. With this configuration, while the information processing device 10 is operating in the menu mode, the user can cause the menu image Im and one or the plurality of program-related images Ip displayed in the past to be displayed in the program display area Ap by switching these images arbitrarily.

The program execution section 22 is realized by the control unit 11 executing each kind of program. In this description, the programs to be executed by the program execution section 22 include the application program AP described so far. In this embodiment, the program execution section 22 executes the program subjected to the operation performed by the user in a case where the user performs an operation for selecting the light program AP2 in the state in which the menu image Im is displayed or a case where the user performs the operation for instructing to start the full-mode program AP1 in the state in which the program-related image Ip corresponding to the full-mode program AP1 is displayed. In addition, the programs to be executed by the program execution section 22 include an event output program that outputs event information during execution of processing thereof. Note that, the event output program may include the application program AP. Further, the event output program may include, for example, various system programs executed as part of a operating system irrespective of the user's explicit instruction.

Particularly in a case where the program execution section 22 executes the full-mode program AP1, the program execution section 22 switches the operation mode of the information processing device 10 to the full mode, and executes the full-mode program. AP1 in the full mode. At this time, as has already been described, the program output image indicating the processing result of the full-mode program AP1 is displayed on the entirety of the screen S, and the user's operations performed through the touch sensor 15 are all processed as inputs to the full-mode program AP1 being executed.

Note that, when the user depresses the operation button 16 while the full-mode program AP1 is being executed, the program execution section 22 interrupts the processing of the full-mode program AP1, and switches the operation mode of the information processing device 10 from the full mode to the menu mode. With this configuration, the menu image display control section 21 again displays the program-related image Ip, which had been displayed before the full-mode program AP1 was started, in the program display area Ap.

While the event output program is being executed, the program execution section 22 outputs various kinds of event information depending on the details of the processing. The event information may be, for example, information for notifying the user that specific processing has been started or finished or information for notifying that a specific condition has been established along with progress of processing of the event output program or with a lapse of time. Specific examples of such event information include information for notifying that a download has been started or finished in a program for downloading data and information for notifying that playback of music has been started or paused in a music playback program. Further, the program execution section 22 may periodically output the event information for notifying of a situation at a current time point. Specific examples of such event information include information for notifying of the number of unread messages at the current time point in a program for receiving electronic mail. Further, in a case where an error occurs in the processing of the application program AP, a case where the operation requested by the user cannot be executed due to some condition, or other such case, the program execution section 22 may output the event information for notifying of details of such failures.

The event information receiving section 23 receives the event information output by the program execution section 22. Note that, in a case where a plurality of event output programs are executed at the same timing, the event information receiving section 23 receives the event information output by each of the plurality of event output programs. In this case, each of the event output programs is configured to output the event information along with information (hereinafter referred to as "program ID") for identifying itself. With this configuration, the event information receiving section 23 can refer to the program ID to identify the program that has output the event information.

The event notification section 24 notifies the user that the event information has been received at a timing when the event information receiving section 23 receives new event information. The notification of the event performed by the event notification section 24 is realized by performing an output for notifying that the event information has been received from some output device. Specifically, the event notification may be realized by a change in display contents displayed on the screen S of the display device 14. Alternatively, the event notification may be realized by causing a light-emitting body provided to the surface of the casing of the information processing device 10 to be lit or to blink, by causing a speaker to output sound, or by other such operation. Alternatively, the event notification may be realized by combining the outputs from those output devices. The event notification allows the user to know that some event has occurred in the event output program being executed by the program execution section 22.

In addition, the event notification section 24 may change a pattern of the event notification between a case where the information processing device 10 is operating in the full mode and a case where the information processing device 10 is operating in the menu mode. More specifically, the event notification section 24 may change the output device used for the event notification depending on the operation mode of the information processing device 10.

Particularly in this embodiment, in the full mode, a single full-mode program AP1 displays the program output image so as to occupy the entirety of the screen S. Therefore, during the operation in the full mode, it may be inconvenient to display an image for notifying of an occurrence of an event within the screen S. Therefore, the event notification section 24 may be configured to perform the event notification by changing the display of the screen S in the case of during operation in the menu mode and perform the event notification by another method different from the changing of the display of the screen S (that is, by another output device different from the display device 14) in the case of during the operation in the full mode.

Figure 6:
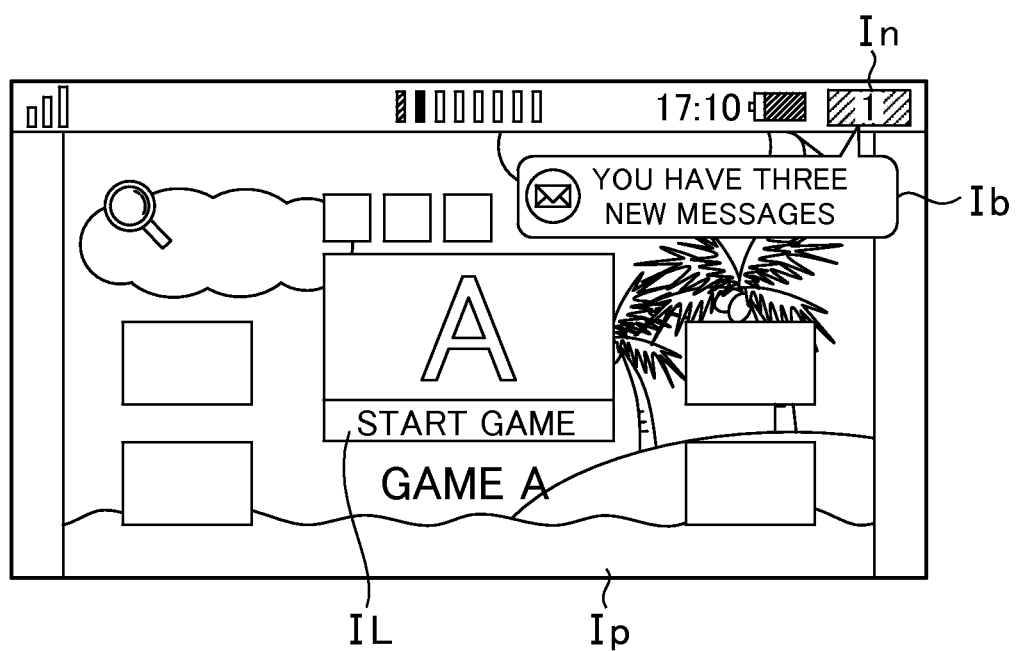

The following description is directed to a specific example of the event notification depending on such an operation mode. In the specific example, when the event information is output during the operation in the menu mode, the event notification section 24 pops up a balloon image Ib, which indicates the details of the event information, on the screen S. Further, the event notification section 24 simultaneously changes the color of the notification image In displayed within a predetermined area of the status bar to a predetermined color, and adds one to a number displayed within the notification image In. The displayed number indicates the number of events that have been notified of so far, and has an initial value of zero. Note that, in a state in which no event notification has been performed, there is no need to display a number within the notification image In. Further, the number may be reset to zero at a predetermined timing, for example, a timing at which a list of the event information described later is displayed. In addition, the event notification section 24 is assumed to display the notification image In with a first color (for example, gray) in the state in which no event notification has been performed, and changes the color of the notification image In to a second color (for example, blue) when the event information is output for the first time, to thereby perform the notification of the event. Then, when new event notification is performed after that, the display color of the notification image In remains the second color without a change, and such an animation that the notification image In blinks for a fixed time or has a shape thereof changed is displayed instead. FIG. 6 illustrates an example of a screen on which the event information described above is notified of. The balloon image Ib may be erased from the screen S after a lapse of a fixed time, or may be erased from the screen S in response to the user's explicit operation (for example, tap operation performed with respect to the position other than the balloon image Ib within the screen S). In addition, in the case of erasing the balloon image Ib, such an animation that the balloon image Ib is sucked up into the position of the notification image In may be displayed.

On the other hand, when the event information is output during the operation in the full mode, the event notification section 24 notifies of the event by causing the operation button 16 to emit light instead of changing the display of the screen S. In this description, the color of the emitted light of the operation button 16 may be the same color as the color (second color described above) to which the color of the notification image In is changed when the event notification is performed for the first time in the menu mode. With this configuration, even when a notification method for the event performed by the event notification section 24 is different between the menu mode and the full mode, the color of the emitted light of the operation button 16 and the color of the notification image In are the same in the case of the event notification, which allows the user to intuitively grasp that the event notification has been performed in either case.

In addition, the operation button 16 is a button used for recovering from the full mode to the menu mode as described above, and when the user depresses the operation button 16 during the operation in the full mode, the status bar that has not been displayed so far is displayed again on the screen S. At the time of recovery to the menu mode, in the same manner as the case where the event notification is performed during the operation in the menu mode, the event notification section 24 may display the balloon image Ib indicating the details of the event information output in the most recent past within the screen S or may change the color of the notification image In to the color (second color described above) indicating that the event notification exists. With this configuration, by operating the operation button 16 itself which has emitted light for the event notification, the user can confirm the details of the event information that has been notified of. In other words, when the event notification is performed during the operation in the full mode, the details of the event information can be confirmed by operating the output device (light-emitting body) itself which has performed the event notification, which allows the user to easily grasp the operation member to be operated for confirmation of the details of the event information. Note that, the operation button 16 is caused to emit light in this description, but instead, for example, the event may be notified of by causing a light-emitting body disposed in the vicinity of the operation button 16 on the surface of the casing of the information processing device 10 to emit light.

Further, when the application program AP whose execution result is currently being displayed on the screen S by the program execution section 22 outputs the event information, the event notification section 24 may determine whether or not the event information received by the event information receiving section 23 is to be notified of depending on the current operation mode of the information processing device 10. For example, when the information processing device 10 is operating in the full mode, the event notification section 24 is configured to prevent the event information output by the full-mode program AP1 whose program output image is being displayed on the screen S from being subjected to the event notification. This is because such event information is generally presented to the user by the program output image displayed on the screen S by the full-mode program AP1 itself even if the user does not confirm the details of the event information by operating the operation button 16 to shift the mode of the information processing device 10 to the menu mode. Note that, in this case, even if the event notification section 24 prevents the event information from being subjected to the notification, the event information received by the event information receiving section 23 may be added to an event log described later. With this configuration, by viewing an event list displayed by the event list display control section 25 later, the user can grasp the occurrence of an event that has not been notified of. On the other hand, when the information processing device 10 is operating in the menu mode, the event notification section 24 may notify of the event information output by the light program AP2 whose program output image is being displayed in the program display area Ap of the screen S by the method of changing the notification image In, the method of popping up the balloon image Ib, or other such method. This allows the user to recognize the occurrence of an event in the same manner as the case where the event is notified of while the program output image generated by another light program AP2 is being displayed.

Figures 7, 8:
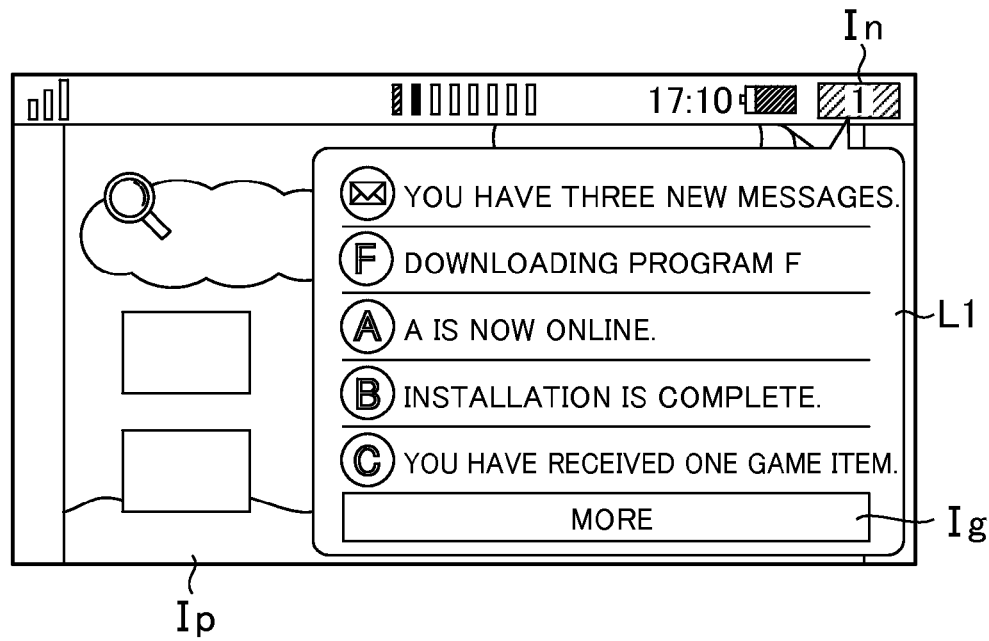
FIG. 7 A diagram illustrating an example of an event log.
FIG. 8 A diagram illustrating an example of a screen for displaying a list of the event information.

In response to a request made by the user, the event list display control section 25 displays, within the screen S, the list of the event information subjected to the notification in the past by the event notification section 24. Note that, the event list display control section 25 refers to the history (event log) of the event information notified of in the past to determine the event information to be included in the list. Specifically, for example, each time the event information is received from the program execution section 22, the event information receiving section 23 adds the received details of the event information to the event log within the storage unit 12. The event list display control section 25 refers to the event log stored in the storage unit 12 to acquire the event information to be included in the list. FIG. 7 illustrates an example of such an event log stored in the storage unit 12. Note that, an upper limit is set for a total number of event information items recorded in the event log, and the older event information items that exceed the upper limit may be deleted in order.

A description is now made of a specific example in which the event list display control section 25 displays the events list. For example, when the user taps the display position of the notification image In located within the status bar in the menu mode, the event list display control section 25 pops up a simple list of the event information (hereinafter referred to as "simple list L1"). Note that, if the total number of event information items stored in the event log exceeds a predetermined upper limit number (for example, five), the event list display control section 25 may cause only the upper limit number of event information items to be included in the simple list L1 and to be displayed. FIG. 8 is a diagram illustrating an example of the simple list L1 popped up as described above, and five display fields indicating the details of five events notified of in the most recent past are displayed within the simple list L1 in an order of the notification of the event. Note that, this figure illustrates a display example of a case where six or more event information items are actually recorded in the event log of the storage unit 12, and a guide image Ig indicating that there is event information that cannot be displayed is displayed in a bottom field of the list. Further, each of the display fields within the simple list L1 includes an icon image indicating the program that has output the corresponding event information and a character string indicating the details of the event information (event message output by the program that has output the event information). In addition, each of the display fields may include information indicating a timing to notify of the event information (for example, information indicating a date/time at which the event information was notified of or information indicating how much time has passed since the event information was notified of up to the current time point).

Figure 9:
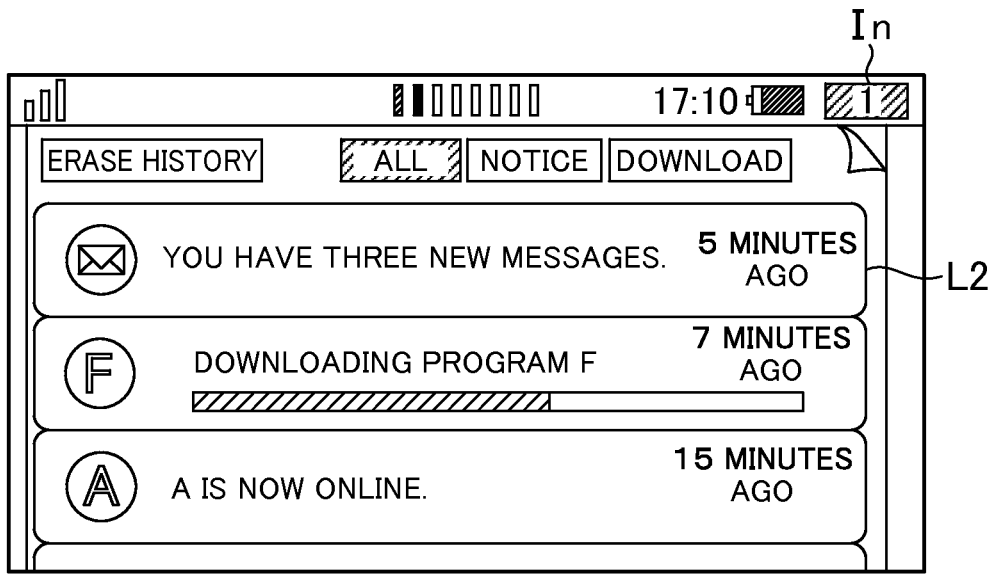
FIG. 9 A diagram illustrating another example of the screen for displaying the list of the event information.

When the user taps the display position of the guide image Ig in a state in which the simple list L1 of FIG. 8 is displayed, the event list display control section 25 displays a list including all the event information items recorded in the event log (hereinafter referred to as "detailed list L2") in the program display area Ap of the screen S. FIG. 9 illustrates an example of the screen on which such a detailed list L2 is displayed. In the example of this figure, only three event information items are collectively displayed within the program display area Ap, but, for example, by performing the slide operation in a vertical direction within the program display area Ap, the user can scroll the displayed event information item to display more event information items than the number of items displayed in the simple list L1.

Note that, the event list display control section 25 may include another display item in the displayed list of the event information in addition to the event information. In the examples of FIG. 8 and FIG. 9, it is assumed that the information processing device 10 downloads various kinds of data and various programs from an external portion via the communication network, and information indicating a download status for each data item subjected to the download is displayed in the list along with the event information. Specifically, for a data item subjected to a download, the event list display control section 25 displays a message indicating that the download is completed if the download has been completed, and displays a message indicating that the download is on standby if the download of the data item has not been started for such a reason that the download of another data item is in execution. Further, when the data item is being downloaded, information indicating download progress (what percentage of the entire data item has already been downloaded) may be displayed. Further, in this example, depending on the selection made by the user, the event list display control section 25 may display only the information indicating a download status in the list or display only the event information items that have been notified of in the list. In the example of FIG. 9, when the user taps an "All" button displayed at the top within the program display area Ap, the list including both the information indicating the download status and the event information items that have been notified of is displayed, while only the event information is displayed in the list when a "Notice" button is tapped, and only the information indicating the download status is displayed in the list when a "Download" button is tapped.

Note that, the information relating to the start and end of the download may not only be displayed by being included in the list displayed by the event list display control section 25 but also be subjected to the notification performed by the event notification section 24. In this case, a program for executing data download processing (download program) functions as the event output program, and outputs the event information for informing of the start and end of the download to the event information receiving section 23. In the same manner as the event information output by another event output program, when the download program outputs the event information for notifying of the start or end of the download, the event notification section 24 notifies the user to that effect by changing the display of the screen S or causing the operation button 16 to emit light.

Figure 10:
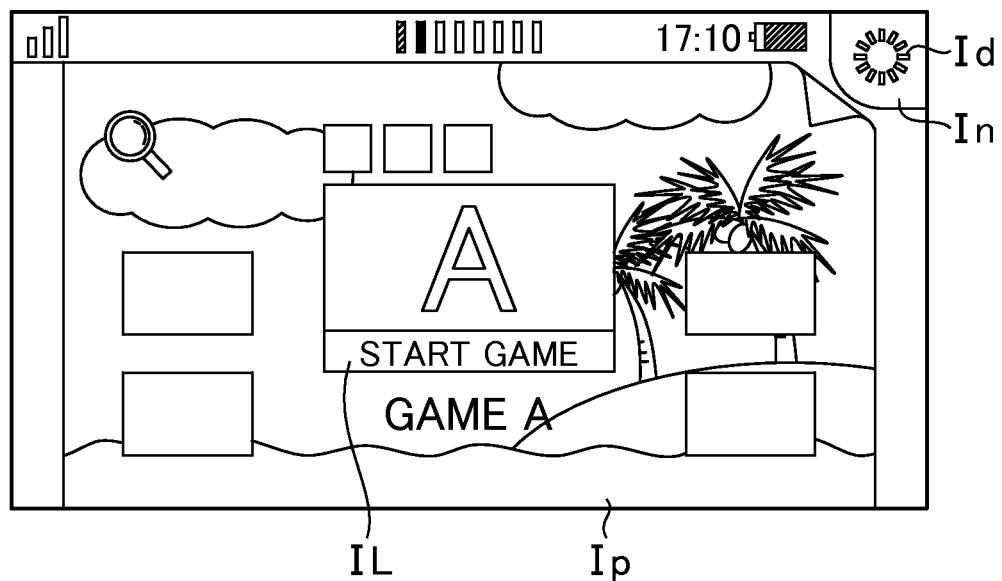
FIG. 10 A diagram illustrating an example of a screen indicating that a download is being executed.

In addition, while the download program is executing the download, the event notification section 24 may notify the user that the download is in execution by changing the notification image In. For example, when the event information receiving section 23 receives the event information on the start of the download, the event notification section 24 displays an icon image Id indicating that the download is in execution within the notification image In. FIG. 10 illustrates an example of a screen on which such an icon image Id is displayed. Note that, in FIG. 10, the shape and size of the notification image In are also different from the above-mentioned display examples. In addition, when the event information receiving section 23 receives the event information on the end of the download, the event notification section 24 finishes displaying the icon image Id, and instead displays the event information on the end of the download as the balloon image Ib, while changing the color of the notification image In to the color indicating that the event information has been received. The icon image Id may be a moving image that changes over time. With this configuration, the user can more easily grasp that the download is in execution. Note that, in the case of notifying the user that the download is in execution by displaying the icon image Id within the notification image In, while the information processing device 10 is operating in the full mode, such an icon image Id cannot be displayed. Therefore, the event notification section 24 switches whether or not to perform the notification that the download is in execution depending on which of the full mode and the menu mode the information processing device 10 is operating in.

Note that, when the user taps an "Erase history" button in the state in which the detailed list L2 of FIG. 9 is displayed, all the details of the event log are erased. Further, irrespective of whether or not the event list is being displayed, when a specific full-mode program AP1 is started in response to the user's instruction, the program execution section 22 may delete the event information output in the past by the full-mode program AP1 from the event log.

In addition, when the user performs an operation for selecting event information within the list by tapping the display field of any one of the event information items in the state in which the event list display control section 25 is displaying the list of the event information, the information processing device 10 may display, on the screen S, the processing result of the program that has output the event information subjected to the selection. More specifically, when the event information output by the full-mode program AP1 is selected, the program execution section 22 restarts the execution of the full-mode program AP1, and displays the program output image drawn by the full-mode program AP1 on the entirety of the screen S. Further, when the event information output by the light program AP2 is selected, the image displayed in the program display area Ap by the menu image display control section 21 is switched to the program output image indicating the processing result of the light program AP2. With this configuration, the user can easily call the program that has output the event information and view the program output image drawn by the program, to thereby confirm the details of the events that have been notified of (for example, details of the unread messages in a case of the event information for notifying the number of unread messages).

Further, in this embodiment, the event list display control section 25 may have a limitation on the number of event information items to be included in the list of the event information for each event output program that has output the event information. A specific example of such control is described below.

As described above, each of the event output programs executed by the program execution section 22 outputs the event information along with the program ID of itself. When receiving new event information, the event information receiving section 23 refers to the program ID to identify the program that has output the event information, and verifies whether or not a predetermined number of event information items output by the same program as the identified event output program are included in the event information subjected to the notification in the past by the event notification section 24 (that is, event information that has already been recorded in the event log of the storage unit 12). Then, if the predetermined number of event information items output by the same event output program have already been included, when the newly-received event information is added to the event log, one of the event information items output by the same event output program is deleted from the event log. Note that, the event information item to be deleted may be, for example, the event information output at the earliest timing among a plurality of event information items output by the event output program. In this description, the predetermined number of items is a list-display upper limit number defined in advance for each event output program, and may be, for example, one. If the list-display upper limit number is one, one event information item is included in the event log for one event output program. Further, the list-display upper limit number may be a number that differs depending on the event output program.

According to such control, only the event information items whose number does not exceed the list-display upper limit number are always included in the event log for each of the plurality of event output programs that outputs the event information. Therefore, even if a given event output program output the event information items whose number exceeds the list-display upper limit number in the past, only the event information items whose number is equal to the list-display upper limit number at most are included in the list for the event output program. Therefore, for example, even if a specific event output program has output a large number of event information items consecutively, it is possible to avoid a situation in which the list is occupied by only the event information items output by the specific event output program, and to display the event information output by another event output program together in the list. In addition, in the case of deleting the event information from the event log, by deleting the event information output at the earliest timing among the event information items output by the same event output program, the event information items whose number is the list-display upper limit number are displayed by being included in the list in an output order from the most recent past. With this configuration, the event information for informing of a more recent processing situation can be preferentially presented to the user for each event output program.

Note that, the upper limit is thus set for the number of event information items displayed in the list for each event output program, which may cause even the event information that has been notified of relatively recently to be deleted from the event log when the same event output program outputs new event information. However, in this embodiment, as described above, when the user selects the event information within the list in the state in which the event list display control section 25 is displaying the list of the event information, the program output image indicating the processing result obtained by the program that has output the event information is displayed on the screen S. In general, the event output program for outputting the event information has a function for presenting, to the user, information items that need to be grasped by the user among the event information items output in the past. Therefore, even if older event information items whose number exceeds the list-display upper limit number are deleted from the event log, one or more event information items output by the same event output program should remain within the list, and hence by selecting the event information item from the list and confirming the processing result of the event output program, the user can view the information relating to the event information items that have been deleted from the event log.

Further, in the description made so far, if the event output program outputs the event information items whose number exceeds the list-display upper limit number, the event information receiving section 23 deletes the older event information items from the event log. However, without performing the deletion from the event log, the event list display control section 25 may merely limit the displaying of the event information items that exceed the list-display upper limit number when displaying the list of the event information, to thereby display the list including the event information items whose number is below the list-display upper limit number. Also in this case, the number of event information items displayed for each event output program is suppressed to equal to or smaller than the list-display upper limit number. In addition, in this case, the event information items that are not to be displayed in the list remain within the event log, and hence, for example, in a case of displaying the event information output by a specific one event output program in the list in response to a request made by the user, the event information items whose number exceeds the list-display upper limit number and which are recorded in the event log may be displayed.

Note that, the information processing device according to the embodiment of the present invention is not limited to the above-mentioned information processing device. For example, the information processing device 10 may be provided with a touch sensor on a back surface side of the casing of the information processing device 10 (back side of a surface on which the screen S is disposed) in place of, or in addition to, the touch sensor 15 disposed so as to be overlaid on the screen S. In this case, the touch sensor on the back surface side is also provided with the detection surface corresponding to the screen S, and allows the user to perform the tap operation and the slide operation on the screen S by bringing his/her finger into contact with the touch sensor. Therefore, by the operation input performed through the touch sensor on the back surface side, the list of the event information may be displayed on the screen S or the displayed list may be scrolled.

Further, the description is made above on the assumption that the full-mode program AP1 operates only in the full mode by occupying the entirety of the screen S and that the light program AP2 operates in the menu mode that allows the menu image display control section 21 to switch the image displayed in the program display area Ap between the plurality of program-related images Ip. However, the information processing device 10 may operate in another operation mode different from the full mode or the menu mode. As one of such operation modes, there may be a median operation mode (intermediate operation mode) between the two operation modes. A program created by assuming the operation in the intermediate operation mode among the full-mode programs AP1 operates in the intermediate operation mode. This program is a kind of the full-mode program AP1, and therefore cannot be executed at the same timing as another full-mode program AP1. However, the entirety of the screen S is not occupied, and the program output image indicating the processing result thereof can be displayed within the screen S simultaneously with the status bar. In such an operation mode, the notification image In can be displayed within the status bar, and hence the event notification may be performed by changing the display of the notification image In in the same manner as during the operation in the menu mode. Alternatively, the event notification may be performed by causing the light-emitting body such as the operation button 16 to emit light in the same manner as during the operation in the full mode.

Further, the information processing device 10 may operate in, for example, an operation mode for displaying the processing results of a plurality of programs simultaneously within the screen S in the form of windows or the like. Also in this case, the information processing device 10 may perform the event notification by changing the display within the screen S during the operation in an operation mode in which a plurality of windows coexist within the screen S, and perform the event notification by causing the light-emitting body to emit light or by other such operation without changing the display within the screen S in the case of operating in the full mode in which a single application program occupies the entirety of the screen S, to thereby realize the event notification in the pattern corresponding to the operation mode.

The invention claimed is:

1. An information processing device, which operates in a plurality of operation modes comprising at least a first mode and a second mode, the information processing device comprising:
a processor that receives event information output by an event output program and notifies, when the event information receiving means receives the event information, a user that the event information has been received,
wherein the processor changes a pattern of notification between a case where the event information receiving means receives the event information during operation in the first mode and a case where the processor receives the event information during operation in the second mode,
wherein the processor performs the notification by causing a light-emitting body to emit light in the case of operation in the first mode,
wherein the light-emitting body comprises an operation button to be operated by the user to confirm details of the event information subjected to the notification,
wherein the first mode comprises a mode of displaying an image drawn by a single application program on an entirety of a screen of a display device, and
wherein the processor performs the notification by changing display of the screen in a case of during the operation in the second mode, and performs the notification by another method without changing the display of the screen in a case of during the operation in the first mode.

2. The information processing device according to claim 1, wherein the processor performs the notification by changing a color of a notification image displayed on the screen to a predetermined color in the case of during the operation in the second mode, and performs the notification by causing the light-emitting body to emit light in the predetermined color in the case of during the operation in the first mode.

3. The information processing device according to claim 2, wherein:
a sensor for sensing an operation of the user with respect to the screen is disposed so as to be overlaid on the screen; and
the processor displays a list of the event information notified in the past on the screen when the sensor senses the operation of the user with respect to a display position of the notification image after the processor performs the notification by changing the color of the notification image.

4. The information processing device according to claim 1, wherein the processor interrupts the notification when the event output program whose execution result is being displayed on the screen outputs the event information during the operation in the first mode, and performs the notification when the event output program whose execution result is being displayed on the screen outputs the event information during the operation in the second mode.

5. The information processing device according to claim 1, wherein the processor displays a list of the event information notified in the past on the screen in response to a request made by the user, wherein:
the processor receives the event information output by each of a plurality of event output programs; and
for the each of the plurality of event output programs, even when the each of the plurality of event output programs output event information items whose number exceeds a predetermined number in the past, only the predetermined number of event information items to be comprised in the list.

6. The information processing device according to claim 5, wherein the processor displays on the screen the predetermined number of event information items output in a most recent past to be comprised in the list among a plurality of event information items output by the plurality of event output programs in the past.

7. The information processing device according to claim 5, wherein the processor displays on the screen, in a case where the user performs an operation for selecting one of a plurality of event information items comprised in the list in a state in which the list of the event information is displayed on the screen, an image indicating a processing result of the event output program that has output the selected one of the plurality of event information items.

8. A control method for an information processing device, which operates in a plurality of operation modes comprising at least a first mode and a second mode, the control method comprising:
an event information receiving step of receiving event information output by an event output program; and
an event notification step of notifying, when the event information is received in the event information receiving step, a user that the event information has been received,
wherein the event notification step comprises changing a pattern of notification between a case where the event information receiving means receives the event information during operation in the first mode and a case where the event information receiving means receives the event information during operation in the second mode,
wherein the event notification step performs the notification by causing a light-emitting body to emit light in the case of during the operation in the first mode, and
wherein the light-emitting body comprises an operation button to be operated by the user to confirm details of the event information subjected to the notification,
wherein the first mode comprises a mode of displaying an image drawn by a single application program on an entirety of a screen of a display device, and
wherein the notification is performed by changing display of the screen in a case of during the operation in the second mode, and the notification is performed another method without changing the display of the screen in a case of during the operation in the first mode.

9. A program for causing an information processing device having a processor, which operates in a plurality of operation modes comprising at least a first mode and a second mode, to cause the processor to:
receive event information output by an event output program and notify, when the event information receiving means receives the event information, a user that the event information has been received,
wherein the processor changes a pattern of notification between a case where the processor receives the event information during operation in the first mode and a case where the processor receives the event information during operation in the second mode
wherein the processor performs the notification by causing a light-emitting body to emit light in the case of operation in the first mode, and
wherein the light-emitting body comprises an operation button to be operated by the user to confirm details of the event information subjected to the notification,
wherein the first mode comprises a mode of displaying an image drawn by a single application program on an entirety of a screen of a display device, and wherein the notification is performed by changing display of the screen in a case of during the operation in the second mode, and the notification is performed another method without changing the display of the screen in a case of during the operation in the first mode.

10. A non-transitory computer-readable information storage medium having stored thereon the program according to claim 9.

* * * * *